United States Patent Office 3,142,671
Patented July 28, 1964

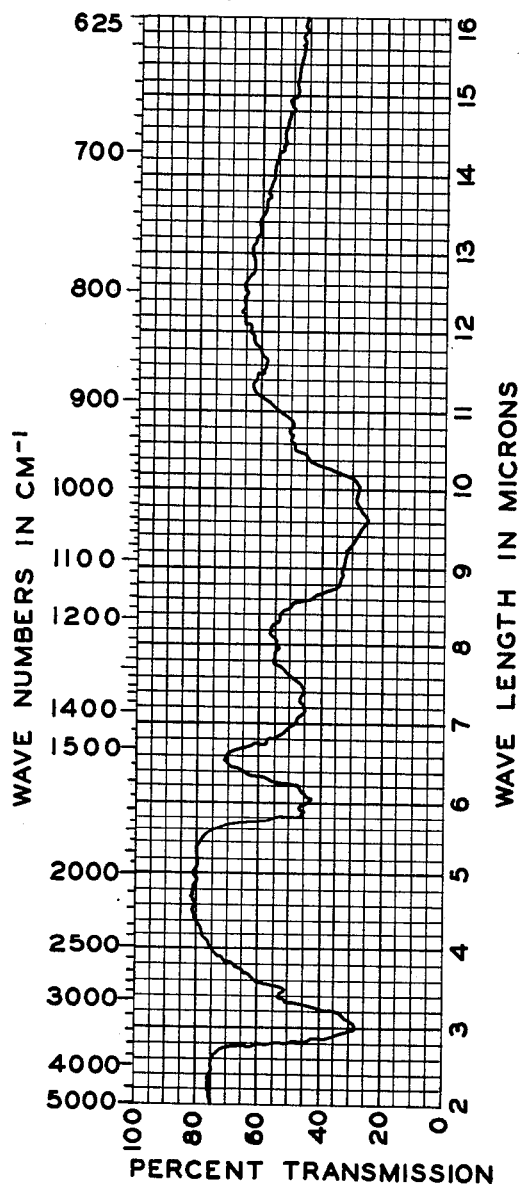
INFRA-RED ABSORPTION SPECTRUM OF GLEBOMYCIN HYDROCHLORIDE
HIROSHI KAWAGUCHI
MASANORI OKANISHI
TAKEO MIYAKI
TOMOO OHMORI
MEIKI MATSUZAKI
HIDEO KOSHIYAMA
HIROSHI TSUKIURA  *INVENTORS*
*BY* BRUCE B. CLYMAN
CURTIS W. CARLSON AND
HERBERT W. TAYLOR JR.
ATTORNEYS.

3,142,671
GLEBOMYCIN AND SALTS THEREOF
Hiroshi Kawaguchi, Masanori Okanishi, Takeo Miyaki, Tomoo Ohmori, Meiki Matsuzaki, Hideo Koshiyama, and Hiroshi Tsukiura, Tokyo, Japan, assignors to Banyu Pharmaceutical Company, Ltd., Tokyo, Japan, a Japanese corporation
Filed May 31, 1962, Ser. No. 199,195
5 Claims. (Cl. 260—210)

This invention relates to a new and useful substance, originally called antibiotic S-438 and now called glebomycin, and to its production. More particularly, it relates to processes for its production by fermentation and methods for its recovery and purification. The invention embraces this antibacterial agent and its acid addition salts in dilute solutions, as crude concentrates, as purified solids and in pure crystalline forms. This substance is effective in inhibiting the growth of Gram-positive, Gram-negative and acid-fast bacteria. This substance is nontoxic and exhibits a therapeutic effect on mice infected with Gram-positive and Gram-negative bacteria. This substance also exhibits a therapeutic effect on infections of virulent tubercular bacilli in mice and guinea pigs.

There is now provided, according to the present invention, a member selected from the group consisting of glebidyl dihydrostreptobiosaminide and acid addition salts thereof.

There is further provided, according to the present invention, a process for the production of glebomycin which comprises cultivating a strain of *Streptomyces hygroscopicus forma glebosus* in an aqueous carbohydrate solution containing a nitrogenous nutrient under submerged aerobic conditions until substantial antibacterial activity is imparted to said solution and then recovering said antibiotic from said solution.

Thus the structural formula of the antibiotic glebomycin may be represented as

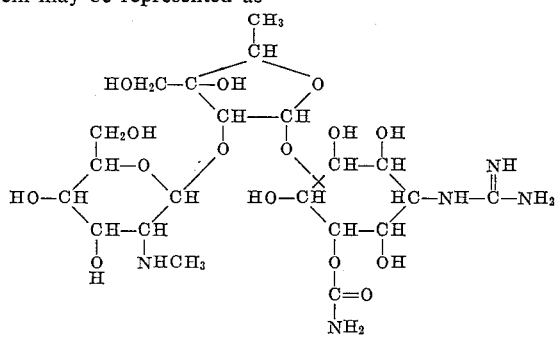

and also as

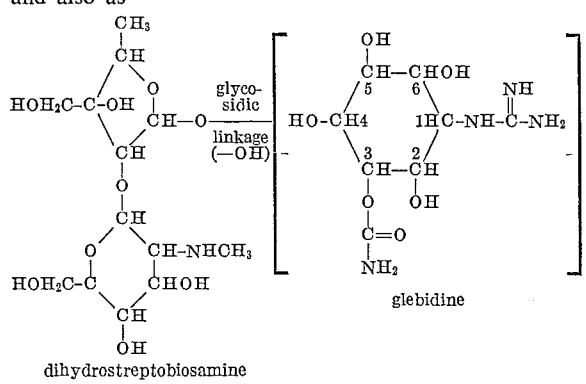

dihydrostreptobiosamine in which dihydrostreptobiosamine is connected at the indicated position by a glycosidic linkage to glebidine at the 4, 5 or 6 carbon atom; the corresponding hydroxyl group is of course removed to form the glycosidic linkage and also, more simply, as

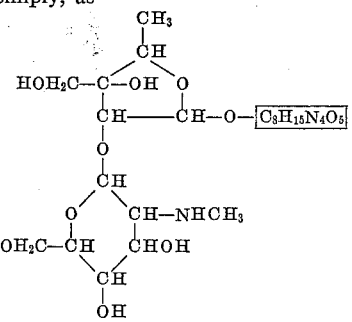

and thus is named glebidyl dihydrostreptobiosaminide.

The organism producing the antibiotic of the present invention was isolated from a sample of soil as Strain No. 12096 and found to be a new form of "*Streptomyces hygroscopicus* and as such has been designated *S. hydroscopicus forma glebosus*. A culture of the living organism isolated from the soil and given the laboratory designations 12096 and A–9634 has been deposited in the American Type Culture Collection, Washington, D.C., and added to its permanent collection of microorganisms as A.T.C.C. 14607.

*S. hygroscopicus forma glebosus* has the following characteristics.

(1) This strain produces frizzled-lumpy sporophores and does not form typical spirals, whorls and clusters.

(2) Glycerin Czapek's agar: The growth color is cloud beige to olive gray to sand, aerial mycelium is white and it produces slightly light brownish gray soluble pigment.

(3) Czapek's agar: The growth color is cloud beize to brownish gray, aerial mycelium is white later becoming grayish white, and it produces slightly beige soluble pigments.

(4) Calcium malate agar: The growth is colorless. White aerial mycelium is scant, and no soluble pigment is produced.

(5) Glucose asparagine agar: The growth is light brownish gray to brownish gray, aerial mycelium is white to light gray, and no soluble pigment is found.

(6) Bennett's agar: The growth is brownish gray, aerial mycelium often becomes moist with black patches which gradually spread over the whole surface. No production of soluble pigment is observed.

(7) Nutrient agar: The growth is glossy and pale yellowish brown, and no aerial mycelium and production of pale yellowish brown soluble pigment are found.

(8) Potato plug: Abundant growth and white aerial mycelium are observed. Plug is not colored.

(9) Glucose-bouillon: Pale yellowish brown pellet mass grows around the wall. Aerial mycelium and soluble pigment are not produced.

(10) Starch agar: The growth is pale yellow to ivory. The aerial mycelium is grayish white becoming moist with black patches which spread over the whole surface. Starch is strongly hydrolyzed.

(11) Gelatin stab: No liquefaction both on gelatin and bouillon gelatin stab.

(12) Tyrosine agar: The growth is poor. Aerial mycelium and soluble pigment are not produced.

(13) Nitrate solution: Colorless pellet mass grows around the wall and nitrate is reduced to nitrite.

(14) Whole egg: The growth is pale yellowish brown and no aerial mycelium nor soluble pigment is produced.

(15) Milk: Pale yellowish ring growth, and no aerial mycelium and no soluble pigment are found. Milk is not digested.

(16) Cellulose agar: No growth.

(17) Carbon sources utilization was tested by the method of Pridham and the following results were obtained: Good utilization was observed with lactose, maltose, sucrose, raffinose, inositol, mannitol or sorbitol. Glucose, galactose and sorbose were poorly utilized. Utilization of arabinose, xylose, cellobiose and sodium succinate were doubtful. No growth was obtained with inuline, sodium citrate, salicin or rhamnose.

From the hygroscopic property of aerial mycelium of the strain described above it is reasonable to consider that the strain belongs to Streptomyces hygroscopicus group, but some differences are found from S. hygroscopicus (Waksman et Henrici) described in Bergey's manual of determinative bacteriology (7th ed.) in some respects such as morphology, growth color on Czapek's and glucoseasparagine agar, reduction of nitrate to nitrite, digestion of milk, liquefaction of gelatin and utilization of carbon sources. A number of strains belonging to S. hygroscopicus group such as S. humidus, S. hygroscopicus K–5–4, S., hygroscopicus var. angustmyceticus has been reported. Comparisons were made with these strains and differences are found in morphology, color of aerial mycelium, reduction of nitrate, digestion of milk and utilization of carbon sources. Furthermore, the strain produces the antibiotic glebomycin which is different, as described in the later part in detail, from antibiotics produced by S. hygroscopicus group such as hygroscopin, hygrostatin, angustmycin, azalomycin, psicoflanine, carbomycin, hygromycin and dihydrostreptomycin. In view of the above facts, this organism was concluded to be a new form of S. hygroscopicus and therefore designated as Streptomyces hygroscopicus forma glebosus.

The above strain represents only one example of the strains useful in the present invention. Strains belonging to other species as well as their variants and mutants can also be used for the same purpose so far as they produce the antibiotic glebomycin. As common properties of streptomycetes, their behavior on the culture medium easily changes spontaneously or may be changed artificially. By this reason, for example, the hygroscopic property of the original strain was lost in some mutants, formation of typical spirals was found in one instance and some mutants showed considerable differences from the original strain in growth characteristics and carbon sources utilization. Hence, the present invention includes, besides the above species, its variants isolated from soil, mutants induced from them by mutating agents such as X-ray, ultraviolet-ray and chemicals, and any strains isolated from soil based on the findings of the present invention in so far as they fulfill the necessary requirements.

For example, the following two strains are both mutants of Streptomyces hygroscopicus glebosus, and they also produce the antibiotic glebomycin.

| | Example 1 | Example 2 |
|---|---|---|
| Czapek's agar | Beige to reddish brown growth, white aerial mycelium, rose beige soluble pigment. | Grayish brown growth, pale pink or grayish white aerial mycelium, beige soluble pigment. |
| Glucose asparagine agar. | Pale brown to beige growth, white aerial mycelium, no soluble pigment. | Grayish red to grayish red purple growth, white aerial mycelium, ivory buff soluble pigment. |
| Bennett's agar | Yellow beige to buff growth, white aerial mycelium, pale yellowish brown soluble pigment. | Ochre to bistre growth, light grayish white aerial mycelium, yellow beige soluble pigment. |

Several strains of streptomycetes have been reported to produce streptomycin group antibiotics, such as S. griseus, S. mashuensis, S. rameus, S. galbus and S. bikiniensis but these species are able to be differentiated from the present micro-organism because of the lack of hygroscopic property. On microscopic examination S. griseus and S. mashuensis show tufts or whorls respectively, and aerial mycelium of the former is tinged with characteristic water-green color, and the latter bears grayish white aerial mycelium and shows dark brown growth. Furthermore, they exhibit different properties in gelatin liquefaction, digestion of milk and utilization of carbon sources from the strain used in the present invention. S. rameus and S. galbus show different characteristics in formation of spirals in their aerial mycelium, color of growth, cultural characteristics in gelatin, milk or nitrate media, and utilization of carbon sources. Especially the fundamental difference is a production of brown soluble pigment when grown on an organic media. While the present strain has no property of chromogenic action, this property is a distinguishable characteristic taxonomically. S. bikiniensis is able to be differentiated because of its chromogenic property and the lack of spirals, tufts or whorls in its aerial mycelium. From the viewpoints of taxonomy or of the antibiotic produced, it is concluded that present strain is a new form of S. hygroscopicus.

As for the production of glebomycin, the culture medium may be solid or liquid, but an aerobic submerged culture is preferable for industrial purposes. As carbon source of low cost, for example, starch, glucose, glycerin, maltose, dextrin, sucrose and lactose can preferably be employed. And as nitrogen source, organic or inorganic nitrogen-containing substances such as soybean meal, peptone, meat extract, cornsteep liquor and nitrate can be used. Also a small amount of inorganic salts, nutrients, growth-promoting substances and precursors may be added to the medium. In the case of submerged culture, the cultivation may preferably be conducted at a temperature of about 25 to 30° C., pH of media being neutral. Although it is different depending upon the producing strains and media, the accumulation of glebomycin can attain several hundred to thousand micrograms per cubic centimeter. Thus suitable conditions for the production of glebomycin by fermenting S. hygroscopicus forma glebosus include all of those set forth for the production of kanamycin in U.S. Patent No. 2,931,798.

PRODUCTION OF GLEBOMYCIN BY FERMENTATION

Fermentation in shake culture: The cultural conditions suitable for the production of glebomycin were examined using reciprocating shaker of 5 cm. amplitude and 120 strokes per minute. One hundred milliliters medium in Sakaguchi's flask of 500 cc. was autoclaved for 20 minutes at 120° C. and about 0.5 cm.$^2$ of the growth on the agar slant was inoculated to the seed medium (2% glycerine, 1% peptone, 0.5% meat extract, 0.1% NaCl, 0.1% $K_2HPO_4$, 0.05% $MgSO_4 \cdot 7H_2O$ and 0.05% $CaCl_2$ pH 7.0), and the 24 hours' culture was used as the seed to the test media. Disc plate assay, Bacillus subtilis as a test organism, was employed throughout the studies. In order to investigate the suitable carbon and nitrogen sources, thirty-two combinations of eight nitrogen sources ($NaNO_3$, $(NH_4)_2HPO_4$, peptone, glycine, soybean flour, corn meal, pharmamedia and dry blood of horse) and four carbon sources (glycerine, glucose, sucrose and soluble starch) were tested. All were effective but the combination of 2.0% soybean flour and 2.5% sucrose yielded the greatest concentration of glebomycin.

The following examples illustrate the preparation of fermentation broth containing the antibiotic.

*Example 1*

MEDIUM

| | |
|---|---|
| Soybean meal g | 20 |
| Sucrose g | 25 |
| Potassium phosphate, dibasic g | 1 |
| Sodium chloride g | 0.5 |
| Magnesium sulfate g | 0.5 |
| Calcium chloride g | 0.5 |
| Zinc sulfate g | 0.01 |
| Yeast extract g | 2 |
| Tap water, q.s. ad 1000 cc. | |
| pH | 7.0 |

A culture medium of 100 ml. containing the above components was sterilized in 50 flasks of 500 ml. volume, inoculated with a seed culture of *Streptomyces hygroscopicus glebosus*, and cultivated at 27±1° C. for six days with shaking, whereupon antibacterial potency of the fermentation broth reached 1,500 mcg./ml.

The fermentation broth was filtered at pH 5.0 and adsorbed by a column of 250 ml. Amberlite IRC–50 (sodium type) at pH 7.0. Amberlite IRC–50 is a commercially available cation exchange resin of the carboxylic type; it is a copolymer of methacrylic acid and divinyl benzene. After washing with water the activity was eluted with 2,000 ml. of 0.1 N hydrochloric acid. The active eluates were combined and adsorbed on a column of 20 g. of activated carbon at pH 8. The carbon was washed with water and eluted with acidic aqueous methanol (containing 10 ml. of 1 N hydrochloric acid in 1,000 ml. of 50% aqueous methanol). The active eluates were concentrated in vacuo at neutral pH to dryness. The solid thus obtained was dissolved in 50 to 60 ml. of absolute methanol, the insoluble part being removed by filtration, and with the addition of ten volumes of acetone to the filtrate, a white precipitate separated which was dried to give 6 g. of pure glebomycin hydrochloride.

*Example 2*

The hydrochloride, 500 mg., obtained as in Example 1 was dissolved in 7.5 ml. of methanol. A solution of methyl orange, 385 mg., in hot water at 75° C. was added to the above methanol solution. After standing for three days at room temperature, the orange needle crystals separated which were recrystalized from 30% aqueous methanol to give 65.8 mg. of crystalline glebomycin helianthate.

*Example 3*

A red-colored mutant strain, 12096–11–46, which was isolated from *S. hygroscopicus glebosus* by irradiation of ultraviolet ray, was inoculated into the medium described above and cultivated aerobically with shaking, whereupon the accumulation of glebomycin reached 1,000 mcg./ml. Through the same treatment as in Example 1 glebomycin was obtained in pure state.

EXTRACTION, PURIFICATION AND PROPERTIES OF GLEBOMYCIN

The general procedures for isolation and purification of a small amount of active compound from fermentation products can be applied for glebomycin. For instance, by utilizing the different absorbability, solubility, distribution coefficient and ionic affinity between the active compound and the contaminating impurities, glebomycin can be isolated.

For example, glebomycin in broth filtrate is adsorbed at neutral to weakly alkaline pH by a carboxylic cation-exchanger such as Amberlite IRC–50 sodium type (Rohm & Haas Co., Ltd.) and then eluted with 0.1 N hydrochloric acid. The active parts are collected and adsorbed by active carbon at pH 8.0, washed with water and then eluted with 50% aqueous methanol containing 0.01 N hydrochloric acid. The eluate is combined and concentrated in vacuo to dryness. The solid thus obtained is dissolved in absolute methanol, insoluble parts being removed by filtration, and with the addition of ten volumes of acetone to the filtrate a white precipitate separates, which is collected and dried. Glebomycin hydrochloride is thus obtained as white powder.

By the addition of saturated aqueous methyl orange solution to the methanolic solution of glebomycin hydrochloride, glebomycin helianthate is obtained as orange needle crystals. After recrystallization from 30% aqueous methanol several times, it melts at 222° C. with decomposition.

*Analysis.*—Found: C, 44.93, 45.04; H, 5.73, 5.58; N, 11.42, 11.87; S, 5.31.

In order to convert it to the sulfate, the helianthate was dissolved in acidic water at pH 2.0 (by sulfuric acid) and, after extracting the methyl orange with n-butanol, the aqueous layer was treated with a small portion of active carbon, adjusted to pH 5.0 by OH-form of an anion exchange resin (Amberlite IRA–411) and lyophilized. The white powder of glebomycin sulfate thus obtained was further purified by reprecipitation from its aqueous solution with the addition of acetone.

The techniques of counter-current distribution is also applied for the purification of glebomycin. With a solvent system comprising n-butanol and an aqueous solution of 5% p-toluene-sulfonic acid, the active compound is distributed in fifty tubes having a peak at tube Nos. 5–6. From these tubes active compound with high purity can be obtained, e.g. by extracting the aqueous phase of each tube twice with fresh n-butanol to remove the remaining p-toluenesulfonic acid, adjusting to pH 5.0 with an anion exchange resin, filtering off the resin and lyophilizing. Carbon chromatography and alumina chromatography can also be utilized for the purification of glebomycin. The glebomycin thus obtained in high purity is characterized by the following physicochemical properties.

(1) Appearance and solubility: Glebomycin hydrochloride and sulfate are white powders. The hydrochloride is soluble in water and methanol and the sulfate is soluble in water but insoluble in most organic solvents (2) Elemental analysis (sulfate): C, 33.11; H, 6.39; N, 9.88; S, 4.67.

(3) Melting point (sulfate): 205° C. (with decomposition).

(4) Optical rotation (hydrochloride): $[\alpha]_D^{20} = -89.0°$ (c.=1, $H_2O$).

(5) Absorption spectra, ultraviolet spectra: Only end absorption is observed; i.e., glebomycin hydrochloride does not show any ultraviolet absorption maxima in the range of 210–400 m$\mu$. Infrared spectra: Glebomycin hydrochloride when pelleted in potassium bromide has the infrared absorption spectra shown in the drawing; the wave lengths in microns of characteristic infrared absorption maxima are as follows: 3.0, 3.5 (weak), 5.8, 6.0, 6.2, 6.8–7.6 (broad overlapping peaks) and 8.7–10 (broad overlapping peaks). Distinguishable absorptions are recognized in glebomycin sulfate from streptomycin or dihydrostreptomycin, e.g., at 1715, 1350 and 1390 cm.$^{-1}$.

(6) Color reactions: The antibiotic gives a positive Sakaguchi but negative maltol reaction unlike streptomycin. The Elson-Morgan reaction is doubtful, but after acid hydrolysis it becomes positive. Anthrone and carbazol reactions are both negative which indicate the difference from mannosidostreptomycins. Ninhydrin, Fehling and Tollens reactions are all negative.

(7) Aqueous stability: The antibiotic glebomycin is stable in aqueous solution over a wide pH range (pH 3–8) for 24 hours at 56° C., but loses more than 50% of its biological activity in a solution of 2 N-HCl or 0.1 N-NaOH within 24 hours at room temperature.

(8) Paper partition chromatography: Comparisons with other streptomycin-group antibiotics by paper partition chromatography in the following systems are shown in Table 1 to indicate the difference from other streptomycins.

SYSTEM

S–1: 100 ml. of 80% aqueous methanol+10.5 ml. piperidine (adjusted to pH 9.09–9.5 with acetic acid).
S–2: 80% methanol, 15% water, 5% glacial acetic acid.
S–3 50% acetone, the sample being dissolved in 5% sodium chloride solution and spotted.
S–4: Wet n-butanol containing 2% (w./v.) p-tolenuesulfonic acid.
S–5: Wet n-butanol containing 2% (w./v.) p-toluenesulfonic acid and 2% (v./v.) piperidine.
S–6: Wet n-butanol containing 2% (w./v.) p-toluenesulfonic acid, 2% (v./v.) piperidine and 2% (w./v.) lauric acid.

TABLE 1

|  | S-1 [1] | S-2 | S-3 | S-4 [2] | S-5 | S-6 |
|---|---|---|---|---|---|---|
|  |  |  |  | Cm. | Cm. | Cm. |
| Glebomycin | 0.74 | 0.66 | 0.83 | 3.0 | 2.6 | 5.6 |
| Streptomycin | 0.68 | 0.33 | 0.06 | 9.3 | 7.9 | 16.0 |
| Dihydrostreptomycin | 0.69 | 0.23 | 0.78 | 8.7 | 4.8 | 11.9 |
| Hydroxystreptomycin | 0.64 | 0.23 | 0.05 | 7.5 | 4.6 | 10.0 |

[1] With system Nos. S-1, S-2 and S-3 an ascending method is employed (shown by Rf values).
[2] With system Nos. S-4, S-5 and S-6 a descending method is employed (shown by moving distances after 24 hours' development).

(9) Molecular formula: $C_{21}H_{39}N_5O_{14}$.

(10) Molecular weight: 585.6.

In summary, glebomycin is a basic, water-soluble antibiotic capable of forming acid addition salts and effective in inhibiting the growth of Gram-positive bacteria, Gram-negative bacteria and mycobacteria which exhibits no ultraviolet absorption from 260 to 400 m$\mu$, which gives a positive Sakaguchi reaction and negative maltol, anthrone, carbazol, ninhydrin, Fehling and Tollens reactions, which has the molecular formula $C_{21}H_{39}N_5O_{14}$ which as its sulfate melts at 205° C. with decomposition, which as its hydrochloride exhibits $[\alpha]_D^{20}$ —89.0° (c.=1, $H_2O$), which as its helianthate melts at 222° C. with decomposition, which exhibits characteristic absorption bands in the infrared region of the spectrum when pelleted in the form of its hydrochloride in potassium bromide at the following wave lengths in microns: 3.0, 3.5, 5.8, 6.0, 6.2, 6.8–7.6 and 8.7–10, and which on standing in methanolic hydrogen chloride for at least three days at room temperature yields methyl dihydrostreptobiosaminide and the compound having the structure

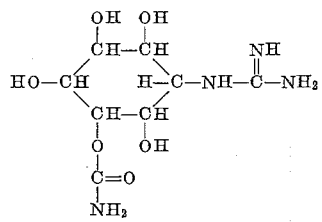

Glebomycin exhibits the physicochemical properties as mentioned above, and the biological properties are as follows.

(1) Antimicrobial spectrum: The minimum inhibitory concentrations of this antibiotic against Gram-positive, Gram-negative, acid-fast bacteria and fungi were determined by serial agar dilution technique. The results are shown in Table 2.

TABLE 2

| Test organism: | Minimum inhibitory concentration (mcg./cc.) |
|---|---|
| Escherichia coli | 31 |
| Escherichia coli (streptomycin resistant) | >1000 |
| Klebsiella pneumoniae | 4 |
| Salmonella typhi | 63 |
| Salmonella paratyphi A | 125 |
| Shigella flexneri | 16 |
| Shigella sonnei | 31 |
| Shigella dysenteriae A | 63 |
| Staphylococcus aureus | 31 |
| Staphylococcus aureus (streptothricin resistant) | 63 |
| Sarcina lutea | 63 |
| Micrococcus flavus | 16 |
| Bacillus subtilis | 8 |
| Bacillus sphericus | >1000 |
| Bacillus mycoides | 8 |
| Bacillus anthracis | 8 |

TABLE 2—Continued

| Test organism: | Minimum inhibitory concentration (mcg./cc.) |
|---|---|
| Corynebacterium xerosis | 4 |
| Lactobacillus casei | 16 |
| Streptococcus faecalis | 8 |
| Streptococcus pyogenes | 16 |
| Diplococcus pneumoniae | 63 |
| Haemophilus influenzae | 63 |
| Mycobacterium tuberculosis v. hominis H 37 Rv | 16 |
| Mycobacterium tuberculosis 607 | 16 |
| Aspergillus niger | >1000 |
| Candida albicans | >1000 |

(2) Effect of cysteine on antibacterial activity: The effect was examined by agar dilution method in a medium containing 2 mcg./ml. of cysteine. The results are shown in Table 3 along with those obtained with commercial streptomycin. Although marked inactivation with cysteine was observed with streptomycin, the activity of glebomycin was not influenced by cysteine.

TABLE 3

| Test organism | Minimum Inhibitory Concentration (mcg./cc.) | | | |
|---|---|---|---|---|
| | Glebomycin | | Streptomycin | |
| | Control | With Cysteine | Control | With Cysteine |
| E. coli | 31 | 31 | 3.1 | 50 |
| Staph. aureus | 31 | 63 | 3.1 | 50 |
| B. subtilis | 8 | 8 | 0.8 | 12.5 |
| Sarcina lutea | 63 | 63 | 0.6 | 50 |
| Shig. dysenteriae | 63 | 63 | 12.5 | >100 |

(3) Chemotherapeutic effect against experimental infection on mice: Mice were infected intraperitoneally with $100 \times LD_{50}$ Staph. aureus, Smith strain, and the antibiotic was administered subcutaneously after the bacterial challenge. The median curative dose following single injection ($CD_{50}$) was found to be 17.2 mg./kg.

(4) Toxicity: The toxicity of glebomycin is extremely low, the intravenous $LD_{50}$ being 2,250 mg./kg. on mice. When 500 mg./kg. of glebomycin was subcutaneously injected into mice daily for 30 days, no adverse effects were observed in their growth or behavior.

When comparing the above-mentioned physicochemical and biological properties of glebomycin with those of other known antibiotics, glebomycin can be concluded to be a new antibiotic. Glebomycin resembles the streptomycin group of antibiotics in properties such as water-soluble basic nature, positive Sakaguchi reaction, cross resistance to streptomycin-resistant strains, and growth of streptomycin-dependent strain in the presence of glebomycin. But glebomycin is different from streptomycin or hydroxystreptomycin in maltol reaction, from mannosidostreptomycin in anthrone reaction, and from dihydrostreptomycin in infrared spectra and paper chromatography. Furthermore, the extremely low toxicity of glebomycin differentiates this antibiotic from any other antibiotics of the streptomycin group.

By virtue of its broad spectrum of antibacterial activity, glebomycin and its salts are useful as general disinfectants, as for glassware; use is thus made of a five percent aqueous solution of glebomycin base or sulfate.

Glebomycin is a useful agent for the treatment of mastitis in cattle or calf scours; for this purpose use is made, for example, of suspensions in vegetable oil for instillation in the teats to teat mastitis, containing 1 to 1000 mgm./ml., and preferably about 50 mgm., of the antibiotic, or enough capsules to provide a total dosage of 0.25 to 2.0 grams by oral administration as for calf scours.

The antibiotic of the present invention is a useful agent for the preservation of fresh-water and salt-water fish. Thus, when dusted over the exposed surfaces of the fish, after cleaning, at the rate of 0.1 to 1000 mgm./kg. of weight of fish, the spoilage and development of odor and rancid taste in the absence of refrigeration is suppressed for many days. This is of particular importance to hunters and fishermen during warm weather. The antibiotic is applied as a solution or suspension in a liquid, e.g., water, or as a powder which may contain inert diluents such as talc and is applied by spraying, dipping or simple dusting.

Included within the scope of the present invention are acid addition salts of glebomycin, and particularly nontoxic pharmaceutically acceptable acid addition salts, with organic and inorganic acids such as hydrochloric cid, sulfuric aicd, hydrobromic acid, hydriodic acid, phosphoric acid, nitric acid, citric acid, maleic acid, malic acid, tartaric aicd, benzoic acid, cinnamic acid, ascorbic acid, acetic acid, picric acid, phytic acid, levopimaric-6,8a-cis-endosuccinic acid, sulfamic acid, glycolic acid and mandelic acid. For therapeutic purposes use is made of salts of nontoxic acids but salts of toxic acids, e.g., picric acid, are useful in isolation procedures, e.g., as precipitants from aqueous solutions, and for disinfectant purposes where toxicity is not important.

When desired for specific purposes and rendered pharmaceutically compatible, there may be admixed with the compounds of the present invention other medicaments such as antihistamines, sulfa drugs (e.g., sulfadiazine, sulfabenzamide, sulfacetamide, sulfanilamide, sulfapyridine, sulfathiazole, sulfapyrazine, sulfaguanidine, sulfathalidine, sulfasuxidine, sulfisoxazole, sulfamylon, phthalylsulfacetamide, N' - 3,4 - dimethylbenzoylsulfanilamide, benzylsulfanilamide and N' - 2 - (2-quinoxalyl)sulfanilamide), lipotropic agents (particularly methionine, choline, inositol and beta-sitosterol and mixtures thereof), stimulants of the central nervous system (e.g., caffeine, amphetamines), local anesthetics, analgesics (e.g., aspirin, salicylamide, sodium gentisate, p-acetylaminophenol, phenacetin, codeine), sedatives (e.g., barbiturates, bromides), salts of penicillin (e.g., potassium penicillin G, procaine penicillin G, l-ephenamine penicillin G, dibenzylamine penicillin G, other salts disclosed by U.S. Patent 2,627,491; these combinations are particularly useful to enable variation of the pattern of blood levels obtained), phenoxymethylpenicillin, phenethicillin, methicillin, oxacillin and other synthetic penicillins and salts thereof, other antibiotic agents (e.g., streptomycin, dihydrostreptomycin, bacitracin, polymixin, tyrothricin, erythromycin, chlortetracycline, oxytetracycline, tetracycline, oleandomycin, chloramphenicol, magnamycin, novobiocin, cycloserine, neomycin, kanamycin; in some cases such combinations attack a wider range of organisms or show synergistic efficacy or provide decreased toxicity with equal efficacy), vitamins (e.g., vitamins A, $A_1$, $B_1$, $B_2$, $B_6$, $B_{12}$ and members of that family, folic acid and members of that family, vitamins C, $D_2$, $D_3$ and E), hormones (e.g., cortisone, hydrocortisone, 9-α-fluorocortisone, 9-α-fluorohydrocortisone, prednisone and prednisolone), anabolic agents (e.g., 11,17-dihydroxy-9-α-fluoro-17-α-methyl-4-androsten-3-one; 17-α-ethyl-19-nortestosterone) and antifungal agents (e.g., mycostatin).

We claim:
1. A member selected from the group consisting of glebidyl dihydrostreptobiosaminide and nontoxic, pharmaceutically acceptable acid addition salts thereof.
2. Glebidyl dihydrostreptobiosaminide.
3. Nontoxic, pharmaceutically acceptable acid addition salt of glebidyl dihydrostreptobiosaminide.
4. The hydrochloride of glebidyl dihydrostreptobiosaminide.
5. The sulfate of glebidyl dihydrostreptobiosaminide.

References Cited in the file of this patent
UNITED STATES PATENTS
2,916,485    Frohardt et al. _____ Dec. 8, 1959